United States Patent [19]

Starling

[11] 4,184,645
[45] Jan. 22, 1980

[54] FLY TYING APPARATUS

[76] Inventor: David M. Starling, 7602 Goddard Dr., #102, Lenexa, Kans. 66215

[21] Appl. No.: 917,906

[22] Filed: Jun. 22, 1978

[51] Int. Cl.² .................. B65H 81/08; A01K 85/00
[52] U.S. Cl. .................................. 242/7.01; 43/1; 242/7.14; 269/76
[58] Field of Search .............. 242/7.01, 7.14; 57/2.5, 57/3, 10; 43/1; 269/76, 236, 97, 240, 243

[56] References Cited

U.S. PATENT DOCUMENTS

| | | | |
|---|---|---|---|
| 2,419,241 | 4/1947 | Wingate | 57/10 |
| 2,669,958 | 2/1954 | Sweeney | 269/76 X |
| 2,825,990 | 3/1958 | Hughes | 242/7.01 |
| 3,106,351 | 10/1963 | Fulton | 242/7.14 |

FOREIGN PATENT DOCUMENTS

| | | | |
|---|---|---|---|
| 836815 | 10/1938 | France | 43/1 |
| 937263 | 3/1948 | France | 43/1 |

Primary Examiner—Billy S. Taylor
Attorney, Agent, or Firm—Fishburn, Gold & Litman

[57] ABSTRACT

An apparatus for tying a fishing fly comprises a compact combination hook retaining clamp and a coordinating thread dispenser and wrapping structure spaced from the retaining clamp and aligned therewith for rotation around a fly held by the clamp. Included is an elongate support connecting the retaining clamp and the thread dispenser and wrapping structure and having clamping portions for mounting to a table top or the like.

4 Claims, 4 Drawing Figures

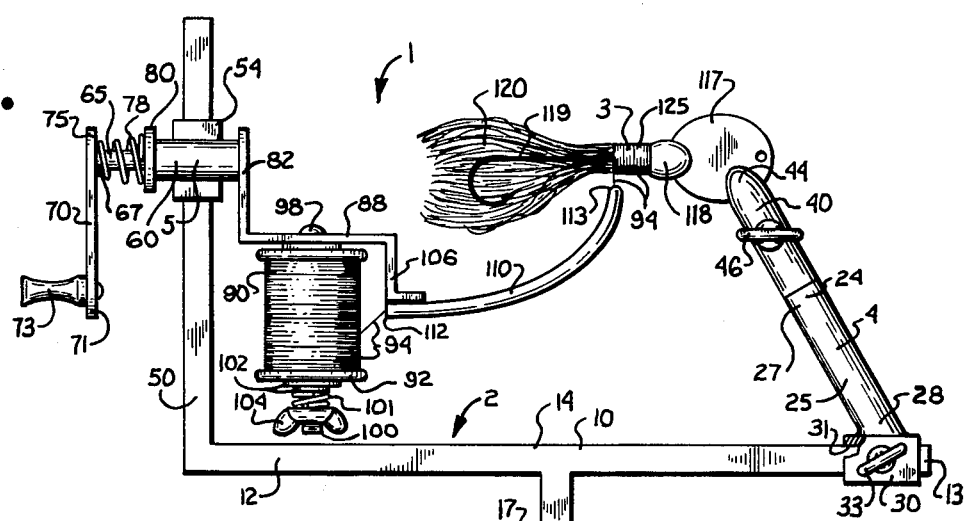
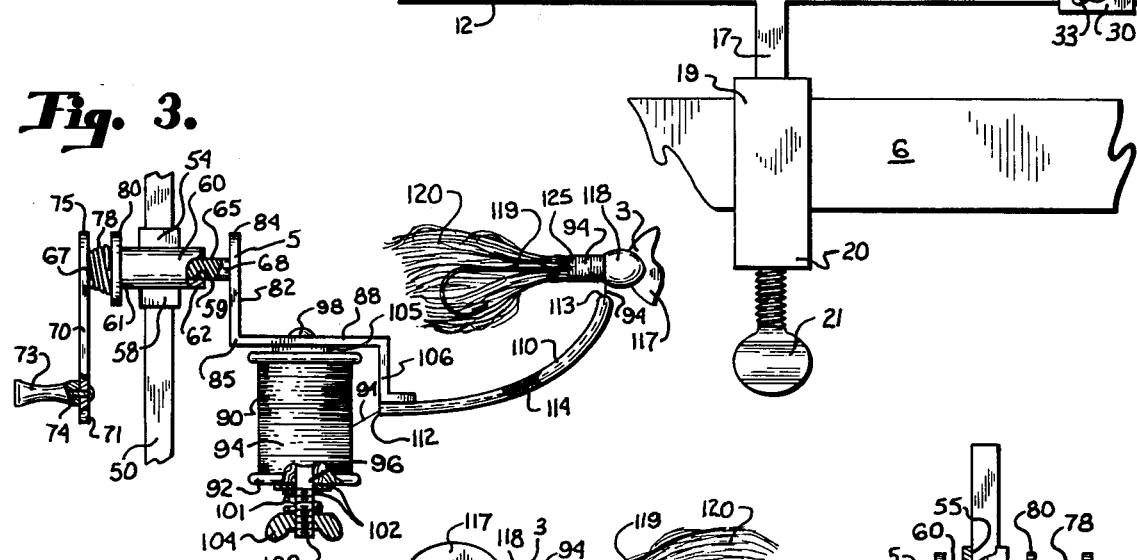
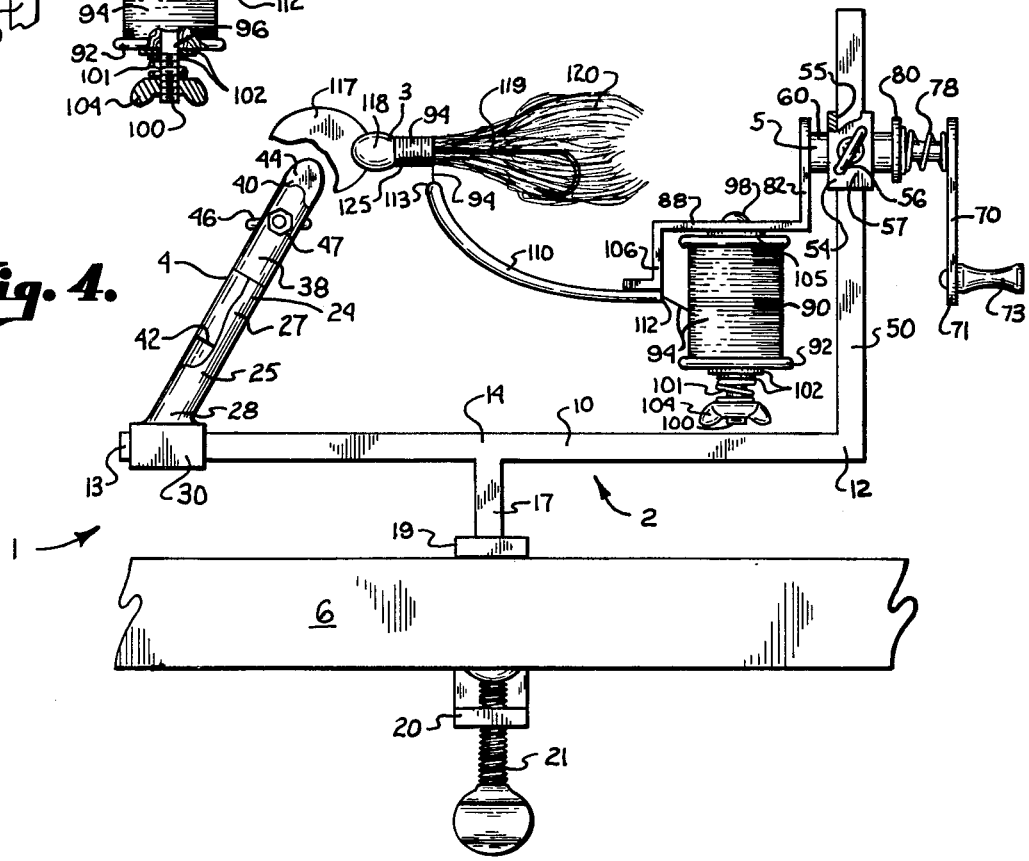

FLY TYING APPARATUS

BACKGROUND OF THE INVENTION

This invention relates generally to devices for forming fishing lures and particularly, to a new and improved apparatus for wrapping or tying flies.

Fishing flies are commonly used by fisherman to lure and tease fish into biting and attempting to swallow the presented bait so that the fish may be hooked and caught. Typically, a fly includes a hook having feathers or hair attached thereto in such manner as to simulate an organism, such as a minnow, a caddis fly larva, or a May fly, normally consumed by the pursued fish, and are laboriously produced by careful hand tying. Fishing enthusiasts often prefer to tie their own flies, both of necessity and as a hobby, to closely simulate natural bait, save expenses over purchased flies, and match their array of lures to particular food organisms occuring in a target locality.

Heretofore, such flies have commonly been tied by the individual fisherman entirely by hand, using an elongated vise or clamp to hold the hook and orient its shank toward the tyer so that work may be performed thereon. In forming the fly, the tyer arranges hair or feathers around the shank as desired to conceal the point of the hook and manually wraps thread around the shank to secure the hair or feathers thereto. To complete the fly, a droplet of wax or similar preservative is applied to the wrapped portion to inhibit unwrapping or premature rotting. It will be appreciated that considerable skill is required when hand-tying a fly to form a smooth, even-tensioned, wrapped body without untidy bunching or overlying of the threads in the wrapping coil.

In view of the above, the principle objects of the present invention are: to provide a compact fly tying apparatus having means securely and evenly wrapping a thread around a hook shank; to provide such an apparatus having a vise or clamp for retaining a hook in proper position for tying operations; to provide such an apparatus having a thread dispenser means for paying out thread to the wrapping site; to provide such an apparatus having an elongate support connecting the clamping means and the thread dispenser structure together in properly spaced relation; to provide such an apparatus having a mount for detachably connecting the apparatus to a working area surface such as a table top or the like; to provide such an apparatus which quickly and evenly ties fishing flies; and to provide such an apparatus which is relatively inexpensive, sturdy and efficient in use and well adapted for the intended purpose.

Other objects and advantages of this invention will become apparent from the following description taken in connection with the accompanying drawings wherein are set forth, by way of illustration and example, certain embodiments of this invention.

FIG. 2 is a front elevational view of the fly tying apparatus and having portions broken away to show internal details thereof.

FIG. 3 is a fragmentary, front, elevational view of the apparatus showing its thread dispenser structure and rotative assembly extended toward the fly and having portions broken away to show internal details thereof.

FIG. 4 is a rear elevational view of the apparatus with portions broken away to show details thereof.

Figure 1:
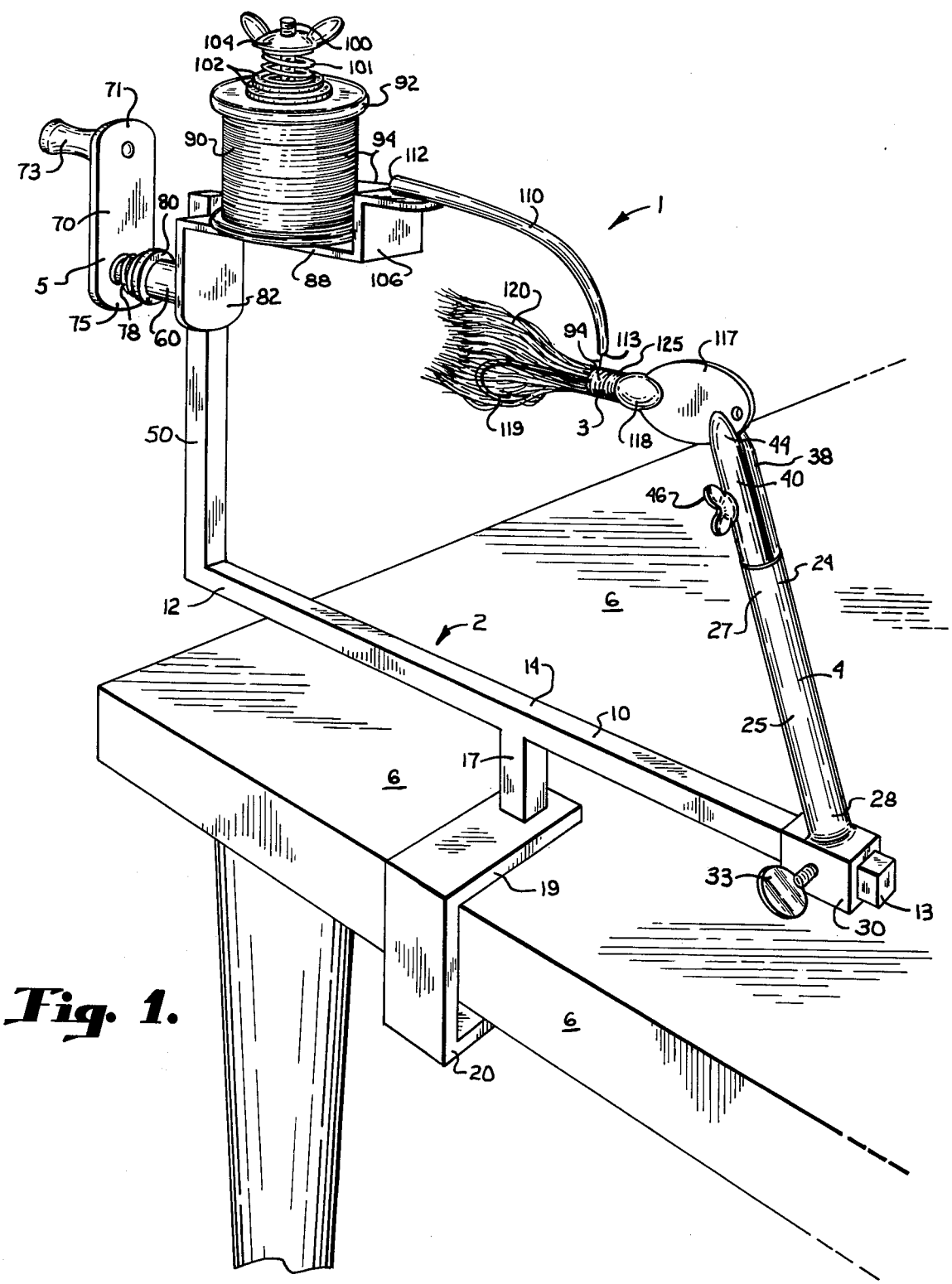
FIG. 1 is a perspective view of a fly tying apparatus embodying the present invention and which is shown mounted on a table top.

Referring to the drawings in more detail:

As required, detailed embodiments of the present invention are disclosed herein, however it is to be understood that the disclosed embodiments are merely exemplary of the invention which may be embodied in various forms, therefore specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally indicates a portable and compact fly tying apparatus embodying the present invention. The apparatus 1 includes a support structure 2 maintaining a clamping or gripping means 4 and a thread dispenser 5 in spaced and aligned relation and that is detachably mountable on a convenient home or shop work supporting planar structure, such as a tabletop 6.

In the illustrated example, the support structure 2 is comprised of a horizontal, elongated support 10 preferably of non-round cross-sectional shape, such as a rectangular bar or the like, and having opposite ends 12 and 13. The support 10 is detachably mounted for portability at its midsection 14, for example, to the tabletop 6 by a connecting means, such as a relatively short standard 17, extended upwardly from a clamping structure such as a C-clamp. As illustrated, an upper or table surface engaging arm 19 and a lower arm 20 cooperate with a thumbscrew 21 for gripping the tabletop 6 between the arms 19 and 20 and adjacent a table edge. So constructed, the standard 17 elevates the support 10 a slight distance above the top surface of the tabletop 6 for translatory movement of the clamping or gripping means 4 along the support 10.

The clamping means 4 comprises a fly receiving and gripping structure and, in the illustrated example, is connected to an arm 25 having an upper end 24 and a lower end 28. The lower end 28 is mounted on a sleeve 30 having an internal through bore 31 commensurately shaped for slidably mounting the sleeve 30 on the support 10. The sleeve 20 is thereby selectively positionable between the end 13 and the midsection 14, and a thumbscrew 33 extended through a wall of the sleeve 30 provides engagement means for retaining the clamping or gripping means 4 at a desired location for properly positioning a fly 3 as described below. Preferably, the arm 25 extends upwardly from the sleeve 30 in an acute angle directed toward the thread dispenser 5 and the opposite support end 12. In order to hold a fly 3, the arm 25, in this example, FIG. 3, is at least partially hollow and has an open end 27 receiving a pair of elongated gripping jaws 38 and 40, thereby forming split pinchers having lower ends 42, FIG. 4, extended into the arm 25 and upper free ends 44 posed for receiving the fly 3 therebetween. A tensioning structure, such as a thumbscrew 46, is extended transversely through the jaws 38 and 40 and is connectible to a fastener 47 nonrotatively secured to the jaw 38 for opening the jaws 38 and 40 and receiving a fly 3 and for contractively closing same and gripping the fly 3.

The opposite support end 12 includes a vertically directed columnar standard 50 mounted normally thereto and extending upwardly at least a distance intersecting a horizontal plane, in the illustrated orientation, through the ends 42 of the jaws 38 and 40. The standard 50 is also preferably non-round in cross-sectional shape and sets the thread dispenser 5 generally in longitudinal alignment with the clamping or gripping means 4.

The thread dispenser 5 includes a rotative assembly in which a sleeve 54, having an internal through bore 55 and opposite wall portions 57 and 58, is slidably mounted on the standard 50. A thumbscrew 56 selectively extends through the wall 57, and provides a means for gripping the standard 50 and positioning the sleeve 54 thereon as desired for horizontal alignment with the jaws 38 and 40. A similar sleeve 60, is mounted to the sleeve wall 58 and aligned orthogonally to the longitudinal axis of the sleeve 54 and slightly turned horizontally so that the axis of the bore 59 is generally directed toward the jaws 38 and 40. By this orientation, the sleeve 60 is also generally parallelly aligned to the longitudinal axis of the support 10. An axle or shaft 65 of greater length than the sleeve 60 extends through the sleeve bore 59 and has opposite ends 67 and 68 forming connecting parts of a revolving crank structure for wrapping thread around the fly 3.

An elongated crank arm 70 is connected normally to the end 67 and has a free end 71 to which a handle 73 is pivotally connected by a pin 74 or the like. Oppositely to the free end 71, a crank arm end 75 extends slightly beyond the connection margin with the shaft 65, thereby completing an abutment surface against which rests one end of a compressibly resilient means, such as a coil spring 78, sleeved on the shaft 65. An other end of the coil spring 78 engages a second abutment surface, such as a washer 80, on the shaft 65. The opposite end 68 of the shaft 65 is mounted normally to an upper free end 84 of an arm 82 which, like the arm 70, extends a slight distance beyond the connection margin with the shaft 65 and provides an abutment surface for engagement with the end 62 of the sleeve 60.

The greater length of the shaft 65 relative to the sleeve 60 enables the shaft 65 to slide longitudinally therethrough, or reciprocate as desired. Normally, the coil spring 78 pushes the shaft 65 outwardly so that the end 68 thereof preferrentially abuts the associated end 62 of the sleeve 60, FIG. 2. However, the handle 73 and crank arm 70 can be gently pushed toward the sleeve 60 during rotation to compress the coil spring 78 and move the end 68 outwardly from the sleeve end 62 and toward the clamping means 4, FIG. 3, until the spring 78 is fully compressed against the washer 80 and the end 61. The rotative assembly further includes an elongated plate or strap 88 mounted normally to an opposite end 85 of the shaft 82 which thereby extends parallel to the support 10 and is accordingly spaced thereabove. An elongated thread guide 110, described below, is mounted to the plate 88 by a connector, such as an L-shaped bracket 106 mounted normally to the strap 88.

A thread storage structure 90 revolutionary with the rotative assembly includes, in the illustrated example, a conventionally shaped spool 92 adapted for receiving thread 94 wound concentrically thereon. The spool 92 is rotatably and removably fastened to the strap 88 by a fastener such as a threaded shaft or rod 96 extended through the spool 92 and having a connection end 98 secured to the plate 88, as by pinning, and a free end 100 associated with a spool tensioning means. The tensioning means includes a coil spring 101 sleeved on the rod 96 adjacent the rod free end 100 and having opposite ends respectively abutting a pair of washers 102 against the spool 92 and a wing nut 104 on the free end 100 which may be selectively tightened or loosened, thereby varying the frictional resistance, for maintaing a desired taut pulling tension or rotational braking of the thread 94. Concurrently, upper washer 105 facilitates rotation of the spool 92 relative to the strap 88.

As illustrated, the bracket 106 extends from the strap 88 a sufficient distance and positions an inlet end 112 of a thread guide 110 spaced from and positioned approximately on the medial portions of the spool 92. Preferably, the thread guide 110 comprises an elongated, curved, relatively rigid tube having an internal through bore 114 extended the length thereof and forming an inlet end 112 disposed as described above, and an outlet end or tip 113 arcuately directed toward the fly 3 grasped by the clamping or gripping means 4. The rigidity of the tubular thread guide 110 enables thread 94 to be extended tautly therethrough with bending the same. Further, the outlet end or tip 113 extends toward the rotative assembly revolutionary axis and winds therearound as the crank arm 70 is revolved.

It will be appreciated that the thread dispenser 5 and the attached thread storage structure 90 permit a thread 94 to be payed out or dispensed through the outlet end 113 under constant tension and wound around the rotational axis of the thread dispenser 5. Significantly, by fixing the position of the spool 92 relative to the thread guide 110, the thread is not twisted as it is emitted but is dispensed without kinking.

Many different types of fishing flies may be wrapped or tied using the apparatus 1. As exemplary of one such lure, an illustrated fly to be tied comprises a spoon 117 connected to a weighted head 118 which is affixed to a hook 119. A streamer, such as formed from hair or feathers, is secured thereto as described below.

The tier first positions the fly 3 so that the longitudinal axis of the part to be tied, such as the shank of the hook 119, extends parallely to the support 10. The portion to be wrapped is then disposed adjacent to the outlet end or tip 113 by selectively positioning the arm 25 along the support 10. Next, the sleeve 54 is moved upwardly or downwardly on the standard 50 until the rotative assembly rotational axis is generally aligned with the longitudinal axis of the portion of the fly 3 to be wrapped. Lastly, the thumbscrew 56 is tightened to maintain the sleeve 54 in position.

The amount of thread 94 remaining on the spool 90 can be ascertained at any time. It will be noted that different weights or colors of thread may be desired for the particular fly and the spool 90 can readily be changed by removing the wingnut 104, the coil spring 101, the washer 102, and slipping the spool 90 off the rod 96. To replace the spool 90 on the thread dispenser 5 the above procedure is reversed.

Wrapping or tying is commenced by drawing a short length of thread 94 from the outlet end 113 and initially holding the end of the thread 94 against the fly. The handle 73 is grasped and revolved, thereby revolving the dispenser 5 about its axis and coiling the thread 94 around the fly. The thumbscrew 104 is adjusted to achieve the desired tautness or line tension for the particular fly. As the thread is wound on the fly 3, slight inward pressure on the handle 73 toward the standard 50 is applied to selectively compress the spring 78 and move the outlet end 113 along the body of the fly 3, thereby forming a slightly elongated wrapped body portion 125 thereon.

When winding has been accomplished to the desired extent, the thread 94 is cut or broken close to the newly formed wrapped body portion 125 and a droplet of cementing and waterproofing substance such as paraffin or the like, is applied. Alternatively, the thread 94 may be cut after the cementing and waterproof substance has been applied. As will be appreciated, a well-formed, smoothly wrapped, threaded body portion 125 can be relatively quickly and easily formed on a fly 3 by the use of this invention without requiring highly practiced skill.

It is to be understood that while one form of this invention has been illustrated and described, it is not to be limited to the specific form or arrangement of parts herein described and shown, except insofar as such limitations are included in the following claims.

What is claimed and desired to secure by Letters Patent is:

1. An apparatus for tying a fishing fly and the like comprising:
   (a) an elongate support member;
   (b) an elongate arm mounted on said support member and extended generally upwardly therefrom; said arm having a releasable gripping means spaced from said support member for holding a fly to be tied;
   (c) a thread dispenser mounted on said support member and spaced laterally apart from said arm; said thread dispenser including means for retaining a supply of thread thereon, a rotative assembly revolutionary around an axis extended generally toward said gripping means, and a thread guide adapted for receiving thread from said supply thereof and having an outlet end extending substantially adjacent said gripping means and disposed from said rotative assembly axis for wrapping thread around the fly held by said gripping means;
   (d) a standard extended upwardly from said support member and having a slideable fastener connecting said thread dispenser thereto, thereby permitting selective positioning of said thread dispenser on said standard;
   (e) said fastener includes a sleeve connected thereto, said rotative assembly being extended through said sleeve;
   (f) resilient means connected to said sleeve and urging said rotative assembly to a preferential position relative to said standard, whereby said thread guide is movable relative to the fly held by said gripping means upon compression of said resilient means.

2. The apparatus set forth in claim 1 wherein:
   (a) said rotative assembly includes a crank arm having a handle positioned therein for manually revolving said rotative assembly.

3. The apparatus set forth in claim 1 including:
   (a) a clamp connected to said support member and extended away from said arm and said dispensing means, said clamp having members spaced for engagement with a work supporting structure.

4. An apparatus for tying a fishing fly and the like comprising:
   (a) an elongate support member;
   (b) an elongate arm mounted on said support member and extended generally upwardly therefrom; said arm having a releasable gripping means spaced from said support member for holding a fly to be tied;
   (c) a thread dispenser mounted on said support member and spaced laterally apart from said arm; said thread dispenser including means for retaining a supply of thread thereon, a rotative assembly revolutionary around an axis extended generally toward said gripping means, and a thread guide adapted for receiving thread from said supply thereof and having an outlet end extending substantially adjacent said gripping means and disposed from said rotative assembly axis for wrapping thread around the fly held by said gripping means;
   (d) said arm includes means slidably mounting same to said support member for translation thereof toward and away from said thread dispenser;
   (e) said rotative assembly is mounted on a standard extended upwardly from said support, said rotative assembly including translatable means slidably mounting same to said standard whereby said rotative assembly is movable on said standard for directing said rotative assembly axis through said gripping means; and whereby said rotative assembly is movable with respect to said translatable means for extending said rotative assembly toward and away from said gripping means;
   (f) said rotative assembly includes a crank structure for manually revolving same;
   (g) said rotative assembly includes a spool shaped for winding thread thereon, said spool being connected to said rotative assembly and having tensioning means connected therewith and providing selective frictional resistance for maintaining tautness as said thread is dispensed, said spool being revolutionary with said rotative assembly for winding thread around said rotative assembly axis; and
   (h) said thread guide includes an elongated tube having a through bore for receiving thread from said spool.

* * * * *